(12) United States Patent
Miller et al.

(10) Patent No.: US 9,569,319 B2
(45) Date of Patent: Feb. 14, 2017

(54) METHODS FOR IMPROVED SERVER REDUNDANCY IN DYNAMIC NETWORKS

(75) Inventors: Raymond B. Miller, Belmar, NJ (US); Edward Grinshpun, Freehold, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 650 days.

(21) Appl. No.: 12/585,576

(22) Filed: Sep. 18, 2009

(65) Prior Publication Data
US 2011/0072122 A1    Mar. 24, 2011

(51) Int. Cl.
*G06F 11/20* (2006.01)
*H04L 29/08* (2006.01)
*G06F 11/16* (2006.01)
*H04L 29/14* (2006.01)

(52) U.S. Cl.
CPC ....... *G06F 11/2041* (2013.01); *G06F 11/1662* (2013.01); *H04L 67/1002* (2013.01); *H04L 69/40* (2013.01); *G06F 11/2028* (2013.01); *G06F 11/2097* (2013.01)

(58) Field of Classification Search
USPC .................. 709/223, 224; 714/4.11, 4.12, 6.3
See application file for complete search history.

(56) References Cited

U.S. PATENT DOCUMENTS

| | | | |
|---|---|---|---|
| 6,353,834 B1* | 3/2002 | Wong et al. | 714/15 |
| 7,164,676 B1* | 1/2007 | Chakraborty | 370/368 |
| 7,260,625 B2 | 8/2007 | Sugiura et al. | |
| 7,293,194 B2* | 11/2007 | Kawamura et al. | 714/4.11 |
| 7,383,463 B2* | 6/2008 | Hayden et al. | 714/4.11 |
| 7,664,788 B2* | 2/2010 | Aust | 707/620 |
| 7,765,427 B2* | 7/2010 | Stange et al. | 714/10 |
| 7,783,742 B2* | 8/2010 | Saha et al. | 709/224 |
| 7,793,147 B2* | 9/2010 | Stange et al. | 714/13 |
| 7,870,104 B2* | 1/2011 | Fujii et al. | 707/689 |
| 7,890,662 B2* | 2/2011 | Albert et al. | 709/248 |
| 7,917,494 B2* | 3/2011 | Muller | 707/711 |
| 8,195,777 B2 | 6/2012 | Hanai et al. | |
| 2001/0054095 A1* | 12/2001 | Kampe et al. | 709/223 |
| 2002/0188711 A1 | 12/2002 | Meyer et al. | |

(Continued)

FOREIGN PATENT DOCUMENTS

| | | | |
|---|---|---|---|
| JP | 2002-522845 A | 7/2002 | |
| JP | 2005-018510 A | 1/2005 | |

(Continued)

OTHER PUBLICATIONS

International Search Report and Written Opinion dated Feb. 18, 2011 issued in International Application No. PCT/US2010/048378.

(Continued)

*Primary Examiner* — Sargon Nano
(74) *Attorney, Agent, or Firm* — Harness, Dickey & Pierce, P.L.C.

(57) ABSTRACT

In one embodiment, a server is assigned a candidate secondary server role such that the dynamic network employs a "make-before-break" redundancy where redundant nodes proactively synchronize replicated data and state information with a standby secondary server prior to releasing the responsibilities of active primary and/or secondary server(s). The "make-before-break" redundancy ensures relatively high availability of dynamic networks and realized services.

15 Claims, 2 Drawing Sheets

(56) References Cited

U.S. PATENT DOCUMENTS

| | | | |
|---|---|---|---|
| 2003/0005350 A1 | 1/2003 | Koning et al. | |
| 2003/0014684 A1 | 1/2003 | Kashyap | |
| 2003/0177411 A1 | 9/2003 | Dinker et al. | |
| 2006/0023627 A1 | 2/2006 | Villait et al. | |
| 2006/0155776 A1* | 7/2006 | Aust | 707/201 |
| 2007/0245337 A1* | 10/2007 | Willis, II | 717/168 |
| 2007/0260696 A1 | 11/2007 | Bohannon et al. | |
| 2008/0016386 A1* | 1/2008 | Dror et al. | 714/4 |
| 2009/0147702 A1 | 6/2009 | Buddhikot et al. | |

FOREIGN PATENT DOCUMENTS

| | | |
|---|---|---|
| JP | 2009157785 A | 7/2009 |
| WO | WO-00/10087 A1 | 2/2000 |

OTHER PUBLICATIONS

Korean Notice of Reason for Refusal dated Jun. 10, 2013 for related Korean Application No. 2012-529806 (full translation provided).
Japanese Office Action dated May 13, 2014, issued in Japanese Patent Application No. 2012-529806, with English translation.
Aug. 4, 2014 Chinese Office Action issued in corresponding CN Application No. 2010-80041279.8 with translation.
Feb. 19, 2014 Chinese Office Action issued in corresponding Chinese Application No. 2010-800412798 (with translation).

* cited by examiner

METHODS FOR IMPROVED SERVER REDUNDANCY IN DYNAMIC NETWORKS

BACKGROUND OF THE INVENTION

Dynamic networks, such as those for emergency response, disaster recovery and/or military operations, require high availability and server redundancy. Simultaneously, these types of networks must also account for the higher probability of individual nodes or clusters of nodes entering and leaving the network due to normal operational scenarios and/or catastrophic failures. These network entries and network exits result in a higher occurrence of controlled and uncontrolled switchovers between redundant nodes in which the network is left unprotected and vulnerable. To reduce network vulnerability, the transient time during these switchovers for which the network is left unprotected should be reduced.

SUMMARY OF THE INVENTION

Current server redundancy mechanisms establish synchronization between a primary server or node and a secondary server or node for the purposes of data and state replication as well as signaling for health monitoring between the systems. When the primary server fails or is interrupted, the secondary server assumes the primary server role and a new secondary server is identified. But, these mechanisms address only single failure conditions. Conventional mechanisms do not handle the case in which the secondary server fails at the same time as the primary server or during the transition from primary to secondary server. This is acceptable for static networks because the likelihood of dual failures is somewhat remote. However, in the case of dynamic networks, nodes enter and leave the network more frequently as part of normal operations. Further, when dynamic networks are deployed as emergency networks or in military situations, they may be more susceptible to multiple failure conditions due to the harsh user environments in which they are deployed. Further still, because current server redundancy mechanisms only address single failure conditions, dynamic networks are left unprotected while establishing data and state synchronization with a new secondary server after the primary or secondary server fails.

Example embodiments employ a "make-before-break" redundancy where the redundant nodes proactively synchronize replicated data and state information with a standby secondary server prior to releasing the responsibilities of active primary and/or secondary server(s). Example embodiments utilize new interactions with mechanisms for assigning redundancy roles to the servers, new interactions with the existing redundancy mechanisms to trigger check-up replication with the new secondary server, as well as bicasting of replicated information from the primary server to both the active and new secondary servers during a transition period.

In connection with example embodiments, the dynamic network nodes may be mounted on emergency or military vehicles to provide wireless access to first responders and/or military personnel. By using $4^{th}$ Generation (4G) broadband wireless cellular access technology, example embodiments may improve the data transfer rate to and from first responders as well as improve in-building penetration for wireless communication.

According to at least one example embodiment, network nodes form a mesh network (1) for inter-node communication, (2) to support mobility of end-users, and (3) to improve scalability (e.g., more vehicles at the scene will be able to support more end-users on the access side). The mesh networks are dynamic in nature in that the network nodes (and vehicles on which the network nodes are mounted) may enter or leave the scene during normal operations.

After having been established, if either the primary or secondary server nodes within the mesh network fails or indicates its intent to leave the network, a role assignment algorithm is executed to elect a new secondary server and trigger a redundancy mechanism to synchronize the new secondary server prior to, for example, signaling the active secondary server that it may leave (if the active secondary server is leaving) or prior to the active secondary server becoming the new primary server (if the active primary server is leaving).

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
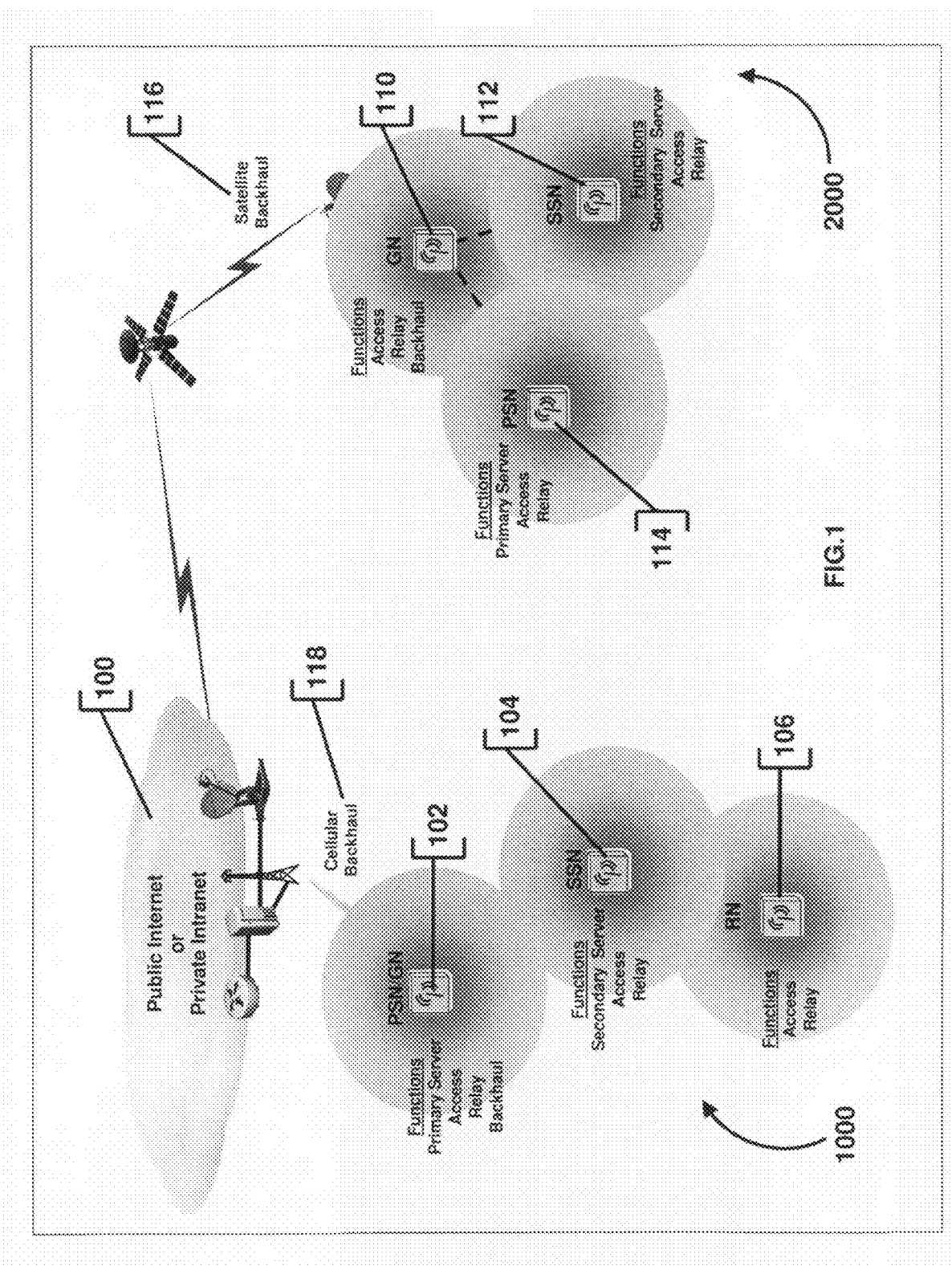
FIG. 1 illustrates a rapidly deployable network in which example embodiments may be implemented.

Various example embodiments will now be described more fully with reference to the accompanying drawings in which some example embodiments are shown. Specific structural and functional details disclosed herein are merely representative for the purposes of describing example embodiments.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed. On the contrary, example embodiments are to cover all modifications, equivalents, and alternatives. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between" "adjacent" versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, actions operations, elements and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems and networks may be shown in block diagrams so as not to obscure the example embodiments in unnecessary detail. In other instances, well-known processes, structures and techniques may be shown and/or discussed without unnecessary detail in order to avoid obscuring example embodiments.

Example embodiments may be described as a process depicted as a flowchart, a flow diagram, a data flow diagram, a structure diagram, signal flow diagram or a block diagram. Although a signal flow diagram may describe the operations or interactions as a sequential process, many of the operations may be performed in parallel, concurrently or simultaneously. In addition, the order of the operations or interactions may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Illustrative embodiments will be described with reference to acts and symbolic representations of operations (e.g., in the form of a signal flow diagram) that may be implemented as program modules or functional processes include routines, programs, objects, components, data structures, etc., that perform particular tasks or implement particular abstract data types and may be implemented using existing hardware at existing network elements or control nodes (e.g., a network nodes or servers with a mesh network). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing," "computing," "calculating," "determining," "displaying" or the like, refer to the action and processes of a computer system, or similar electronic computing device (e.g., a network node or server within a mesh network), that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of programmable or computer readable storage medium. The storage medium may be magnetic (e.g., a floppy disk or a hard drive) or optical (e.g., a compact disk read only memory, or "CD ROM"), and may be read only or random access. The example embodiments are not limited by these aspects of any given implementation.

FIG. 1 illustrates a dynamic rapidly deployable network (RDN) including two smaller mesh networks 1000 and 2000 in which methods according to example embodiments may be implemented.

Referring to FIG. 1, the dynamic RDN includes a satellite backhaul network 116, which is connected to a cellular backhaul network 118 by a private intranet or the Internet 100.

A first mesh network 1000 is connected to the Internet or private intranet 100 via the cellular backhaul network 118.

As is well-known, a wireless mesh network (WMN) is a wireless communications network composed of radio nodes organized in a mesh topology. Wireless mesh networks are dynamic. Often, wireless mesh networks include mesh routers and gateways.

Mesh routers are generally computers/servers that forward traffic to and from each other as well as mesh gateways. Mesh gateways are also computers/servers that may connect to, for example, the Internet. In one example, wireless mesh networks can be implemented with various wireless technologies including 802.11, 802.16, cellular technologies or combinations of more than one type. The mesh routers and/or gateways generally have wireless communication capabilities to serve and provide access to end-user terminals. End-user terminals may include mobile phones, laptops, personal digital assistants (PDAs) or any other device having wireless transmission capabilities.

Referring back to FIG. 1, the first mesh network 1000 includes a plurality of network servers or nodes 102, 104, 106 connected to one another via wireless communications links. These servers in the first mesh network 1000 are referred to as RDN Mobile Network Nodes (RDN MNNs). In the mesh network 1000 shown in FIG. 1, the plurality of servers 102, 104, 106 may be mesh gateways or mesh routers having well-known capabilities as well as the additional capabilities discussed herein. The mesh network 1000 may serve a plurality of end-user terminals (not shown) within reach of each nodes cellular boundary.

In FIG. 1, a second mesh network 2000 is connected to the first mesh network 1000 via the satellite backhaul network 116, the Internet or the private intranet 100 and the cellular backhaul network 118. The second mesh network 2000 also includes a plurality of network servers or nodes 110, 112, 114 connected to one another via wireless communications links. As was the case with the mesh network 1000, the plurality of servers 110, 112, 114 may be mesh gateways or mesh routers. Although not shown in FIG. 1, a plurality of end-user terminals may also be present in the second mesh network 2000.

The plurality of network nodes or servers shown in FIG. 1 may be mounted on, for example, emergency vehicles to provide wireless access to emergency first responders.

By utilizing wireless mesh networks such as the mesh networks 1000 and 2000 shown in FIG. 1, the size required for a particular incident may be scaled relatively easily by deploying more (or less) RDN MNNs to a given location (e.g., disaster location, forward area, etc.).

As will be discussed in more detail below, each of the plurality of servers 102, 104, 106 of the first mesh network 1000 may be assigned a role within the mesh network. Although specific roles will be discussed with regard to specific ones of the plurality of servers 102, 104, 106, it will be understood that each of these servers or nodes may serve any of the roles within the mesh network 1000. Moreover, although only three network nodes are shown in the mesh network 1000, it will be understood that each of mesh network 1000 and 2000 may include any number of network nodes.

Figure 2:
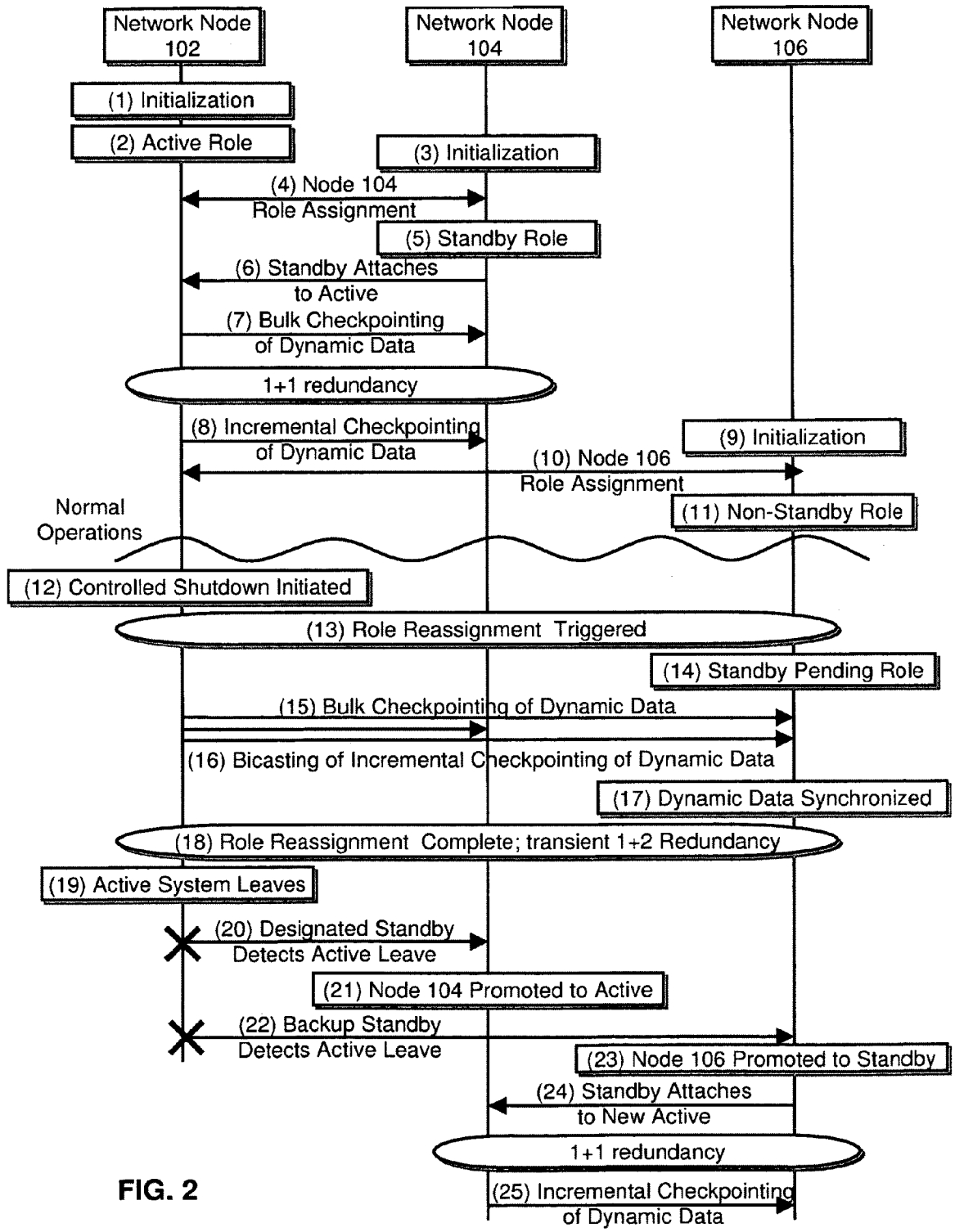
FIG. 2 is a signal flow diagram for illustrating a method for improved server redundancy according to an example embodiment.

FIG. 2 is a signal flow diagram for describing a method for improving server redundancy in a dynamic network. The signal flow diagram shown in FIG. 2 illustrates example interaction between servers of the mesh network 1000 in a situation in which a controlled shutdown of an active primary server with a make-before-break redundancy is performed. It will be understood that example embodiments may be implemented in conjunction with other networks, dynamic or otherwise.

Referring to FIG. 2, at step 1, a first server 102 is initialized. Initialization includes, but is not limited to, power up of the system and its components, starting of the system processes and services to a stable state of operation, and completion of network entry of the server into the mesh network 1000.

At step 2, a role assignment algorithm is performed within the mesh network 1000. Role assignment is a mechanism that runs on each network server upon entry into (initialization within) the wireless mesh network to negotiate and assign roles to nodes within the wireless mesh network. An example role assignment mechanism is described in U.S. patent application Ser. No. 11/953,426 (Publication No. 2009/0147702) to Buddhikot et al., which was filed on Dec. 10, 2007.

For example, after or in response to initialization within the mesh network, each network node is assigned a "role" based on network topology and what roles have already been assigned to network nodes in the mesh network. In the example mesh network 1000 shown in FIG. 1, there are five possible roles for a network node. In some cases, a network node may be assigned more than one role. The possible roles for each node include:

1. Relay Node (RN): This is the basic role in a dynamic RDN. In this role, a given network node has its access and relay interfaces active. The RN participates in the mesh network with its neighboring network nodes and provides access to end-user-devices. The backhaul interfaces for the RN are inactive. As a result, the RN cannot directly access the backhaul networks such as an external macro-cellular, satellite, or wireline network. Instead, the RN accesses the external backhaul networks via a Gateway Node (GN).
2. Primary Server Node (PSN): This network node acts as a Relay Node (RN) as well as hosts the centralized services necessary for operation of the RDN wireless network. Centralized services may be any service where there is a single active instance of the service for the entire instance of a particular mesh network. Conversely, distributed services are on a per-node basis. There is one active PSN per mesh network.
3. Secondary Server Node (SSN): This network node acts as a RN as well as a redundant network node in the event the active PSN fails or exits the network. Applications running on the PSN synchronize their dynamic persistent data to their counterpart applications in the SSN, thereby enabling a relatively smooth handoff between the PSN and SSN when necessary.
4. Candidate Gateway Node (CGN): This network node acts as a RN and has an enabled backhaul interface. The CGN is capable of providing access to a backhaul network such as an external macro-cellular, satellite, or wireline network, but does not act as an active gateway for any network node.
5. Gateway Node (GN): The GN acts as a RN and has its backhaul interface active. The GN also serves as a gateway to a backhaul network such as an external macro-cellular, satellite, or wireline network. Thus, other network nodes in the mesh network may access the external networks via the GN.

Referring back to Step 2 in FIG. 2, through the role assignment algorithm, the network nodes 102, 104 and 106 within the mesh network 1000 determine which of the nodes will serve as the PSN. For example, if network node 102 is the first and only node initialized within the mesh network 1000, this network node is assigned the role of primary server or PSN. For the sake of discussion, it is assumed that network node 102 is assigned the primary server role. As such, the network node 102 is sometimes referred to herein as the PSN 102. After having assigned the network node 102 the primary server role, normal active system operations begin. As is known in the art, normal active system operations include authentication/authorization and possible admittance of subscribers on end-user terminals into the mesh network 1000, transmitting and receiving information to and from end-users within the mesh network 1000, traffic policies and applying Quality of Service (QoS) mechanisms, and other operations consistent with the operation of mesh routers.

Upon (or in response to) initialization of another network node, for example, network node 104 at step 3, the role assignment algorithm is performed between network nodes 102 and 104 at step 4. During the role assignment algorithm, because the network node 102 is already serving as the PSN, the network node 104 is assigned a secondary (standby) server role (at step 5). In this simple example, node 104 is selected as the SSN since it is the only other node present. However, in larger, more complex network topologies, the selection of the SSN may include, but is not limited to, factors such as the number of network hops away, the routing tree topology, and processor load on the particular network node.

At step 6, network node 104 attaches to the active PSN 102 as the designated secondary server or SSN. After being designated the SSN, dynamic persistent data at the active PSN 102 is synchronized with the dynamic persistent data at the active SSN 104 at step 7. For example, at step 7 dynamic persistent data at the active PSN 102 is bulk-checkpointed to the active SSN 104.

Bulk-checkpointing is the transfer of the complete data store from one network node to another to synchronize the data at the network nodes in the dynamic RDN. Bulk-checkpointing is performed when a SSN has no redundant data from the active PSN. In this example, the bulk-checkpointing is performed after the SSN 104 has initially been assigned the secondary server role.

In more detail, "dynamic data" is the data of a running application, such as state information, that is stored in memory and usually does not survive a process restart. "Dynamic persistent data" is dynamic data that is stored in some persistent memory store so that the data persists across a process restart. For example, dynamic persistent data may be dynamic object state information (e.g., object being called, service flow, etc.) that a device (e.g., a network node) is required to maintain in software to provide the associated functions and services. "Static data" is data that is stored in a long term storage device, such as a database on a disk drive. For example, static data may be system configuration data such as host name, domain name, or the provisioning of subscriber information.

Bulk-checkpointing of dynamic persistent data between network nodes may be performed in various ways. For example, the data may be saved in a memory or on a disk shared between network nodes depending on the required access speed. In a redundant architecture example, specific dynamic data on the PSN 102 is modified as a result of transactions or events within or to the applications, while this dynamic data on the SSN 104 is modified as a result of replication of the active PSN 102.

As shown visually in FIG. 2, synchronization of the dynamic persistent data between the active PSN 102 and the active SSN 104 provides 1+1 redundancy in the mesh network.

At step 8, synchronization between the active PSN 102 and the active SSN 104 is updated. In one example, at step 8, subsequent dynamic persistent data changes at the active PSN 102 are incrementally checkpointed to the active SSN 104. Incremental checkpointing is the transfer of only the delta or difference between the two synchronized network nodes (e.g., the active PSN 102 and the active SSN 104). This occurs, for example, when some, but not all of the dynamic persistent data on the active PSN 102 has been modified since the most recent bulk-checkpointing between the active PSN 102 and the active SSN 104. Incremental checkpointing may be triggered each time a dynamic persistent data object is modified, each time a set of dynamic persistent data objects is modified, or on a more granular basis. That is, for example, incremental checkpointing may occur on a per modified dynamic persistent data object basis, a per modified set of dynamic persistent data objects basis, or some more granular basis. Incremental checkpointing is not performed if dynamic persistent data on the active PSN 102 has not been modified.

After having been synchronized with the active PSN 102, the active SSN 104 monitors the health of the PSN 102. In the event that the active PSN 102 fails or performs a controlled shutdown, the active SSN 104 is ready to assume the primary server role. For example, SSN 104 may send a message to PSN 102, expecting an acknowledgement from PSN 102. If, after a number of retries to account for possible packet loss within the network, SSN 104 does not receive an acknowledgement from PSN 102, SSN 104 assumes the primary server role responsibilities. If, in the future, PSN 102 becomes reachable again, the role assignment mechanism may downgrade one of the nodes to SSN status.

After establishing the mesh network 1000, other systems (e.g., network nodes 106) may enter and be initialized within the mesh network 1000. An example situation in which this occurs will be described in more detail below with reference to FIG. 2.

Referring still to FIG. 2, for example, at step 9 a network node 106 enters the mesh network 1000 in the same manner as discussed above with regard to step 3. After (or in response to) initialization, at step 10, the role assignment algorithm is performed between the active PSN 102, the active SSN 104 and the newly entered node 106. Because both the primary and secondary server roles have already been assigned in the wireless mesh network 1000, network node 106 is assigned a non-redundant role at step 11. For example, network node 106 is designated as a relay node (RN). The RN 106 then begins normal operations.

During normal operations, the active PSN 102 may initiate a controlled shutdown (e.g., in expectation of leaving the mesh network). As noted above, example embodiments will be discussed with regard to this situation. However, a similar process may occur if the active PSN 102 begins to fail, rather than initiate a controlled shutdown.

Referring back to FIG. 2, at step 12 the active PSN 102 initiates a controlled shutdown because it intends to leave the mesh network 1000. In response to an indication or notification that the active PSN 102 intends to leave the mesh network 1000, the role assignment algorithm is triggered to identify a candidate SSN at step 13. The candidate SSN is a standby SSN, which will become the active SSN after being synchronized with the active PSN and active SSN. At step 14, a candidate SSN is identified and assigned the candidate secondary server role pending completion of dynamic persistent data synchronization with the active PSN 102 and SSN 104. In the example shown in FIG. 1, the network node 106 is identified as the candidate or standby SSN.

At step 15, running dynamic persistent data at the active PSN 102 is synchronized with dynamic persistent data at the candidate SSN 106. In one example, the running dynamic persistent data at the active PSN 102 is bulk-checkpointed to the candidate SSN 106.

While synchronizing the dynamic persistent data between the active PSN 102 and the candidate SSN 106, any incremental changes to the dynamic persistent data are bi-casted to both active SSN 104 and the candidate SSN 106 to ensure if either the active SSN 104 (the candidate PSN) or the active PSN 102 servers fail, at least one SSN is still present in the mesh network 1000.

Upon completion of dynamic persistent data synchronization between the active PSN 102 and the candidate SSN 106, dynamic persistent data at the active PSN 102, the active SSN 104 and the candidate SSN 106 is synchronized at step 17. Once synchronized, the role assignment algorithm is complete and the dynamic network is in a transient 1+2 redundant state.

The active SSN 104 continues to monitor the health of the active PSN 102 and is prepared to assume the primary server role when the active PSN 102 completes the controlled shutdown (or alternatively fails). In addition, the candidate SSN 106 is ready to become the active SSN if the active SSN 104 or the active PSN 102 fails or leaves the mesh network 1000.

Returning to step 19, when the active PSN 102 completes the controlled shutdown (e.g., exits the dynamic RDN), the active SSN 104 detects the exit of the active PSN 102 at step 20, and the active SSN 104 promotes itself to the active primary server role at step 21. The SSN 104 then informs all other nodes of its new status.

In parallel, at step 22 the candidate SSN 106 detects the exit of the active PSN 102 from the mesh network 1000, and promotes itself to the active secondary server role at step 23. Note that in order to reduce (e.g., minimize) the time that the network is left unprotected, SSN 106 does not wait for the message sent from SSN 104 indicating its promotion to PSN status before SSN 106 promotes itself to active SSN. Thus, the promotion of the candidate SSN 106 to the active SSN may actually occur before or in parallel with the promotion of the SSN 104 to the PSN.

At step 24, the now active SSN 106 attaches to the newly active PSN 104 and at least 1+1 redundancy is continuously maintained in the mesh network 1000 despite the controlled shutdown of the PSN 102.

Subsequent dynamic persistent data changes of the active PSN 104 are then incrementally checkpointed to the active SSN 106 at step 25.

After having assumed the secondary server role, the active SSN 106 monitors the health of the PSN 104 and is prepared to become the PSN if PSN 104 fails or performs a controlled shutdown.

Subsequently, similar scenarios occur when the designated or active SSN leaves the network or when any three of the nodes fail in the dynamic network. When the active SSN leaves the network, 1+1 redundancy is maintained because the candidate SSN (e.g., node 108) promotes itself to the active secondary server role.

Moreover, although not discussed explicitly herein, the same procedures may be performed within to the second mesh network 2000 shown in FIG. 1. Because these procedures are substantially the same as those discussed above with regard to the first mesh network 1000 in FIG. 1, a detailed discussion is omitted.

Example embodiments ensure relatively high availability of dynamic networks and realized services. More generally, example embodiments improve availability of dynamic networks and services for all networks, but especially those which are dynamic and/or prone to multiple simultaneous failures.

Example embodiments reduce the time that dynamic networks are left unprotected, for example, during a transient period of redundancy switchover. This may increase the availability of the network and services, which are particularly important during emergency situations.

The invention being thus described, it will be obvious that the same may be varied in many ways. Such variations are not to be regarded as a departure from the invention, and all such modifications are intended to be included within the scope of the invention.

We claim:

1. A method of operating a dynamic network, the method comprising:
    assigning a primary server role to a first server;
    assigning a secondary server role to the second server;
    synchronizing dynamic persistent data between the first and second servers;
    assigning a candidate secondary server role to at least a third server;
    synchronizing the dynamic persistent data between the first and third servers, prior to removal of the first and/or second servers from the network, the dynamic persistent data including state information;
    promoting the third server to the primary server role if the first and second servers are removed from the network at the same time.

2. The method of claim 1, further comprising:
    initiating controlled shutdown of the first server in expectation of removal of the first server from the dynamic network.

3. The method of claim 2, further comprising:
    identifying the third server as a candidate secondary server; and
    promoting the second server to the primary server role in response to an indication that the first server has been removed from the dynamic network.

4. The method of claim 3, wherein the synchronizing dynamic persistent data of the first server with each of the second and third servers comprises:
    bulk-checkpointing dynamic persistent data of the first server with the second server.

5. The method of claim 4, wherein the synchronizing dynamic persistent data of the first server with each of the second and third servers comprises:
    bulk-checkpointing dynamic persistent data of the first server with the third server.

6. The method of claim 5, wherein the synchronizing dynamic persistent data of the first server with each of the second and third servers comprises:
    bicasting subsequent, incremental changes to the dynamic persistent data of the first server to each of the second and third servers.

7. The method of claim 3, wherein the synchronizing dynamic persistent data of the first server with each of the second and third servers comprises:
    bicasting subsequent, incremental changes to the dynamic persistent data of the first server to each of the second and third servers.

8. The method of claim 1, wherein the synchronizing step comprises
    bulk-checkpointing dynamic persistent data of the first server to the second server.

9. The method of claim 8, wherein the synchronizing step further comprises:
    incrementally checkpointing subsequent changes to the dynamic persistent data of the first server to the second server.

10. The method of claim 1, wherein the removal of the first server from the dynamic network is one of a controlled shutdown and failure of the first server.

11. The method of claim 1, further comprising:
    reassigning the primary server role to the second server in response to an indication that the first server has been removed from the dynamic network; and
    reassigning the secondary server role to the third server in response to the indication that the first server has been removed from the dynamic network without requiring bulk data synchronization of the dynamic persistent data between the second and third servers following removal of the first server from the dynamic network, the bulk data synchronization including the synchronization of all of the dynamic persistent data.

12. The method of claim 11, further comprising:
    incrementally checkpointing subsequent changes to the dynamic persistent data of the second server to the third server.

13. The method of claim 1, wherein the removal of the second server from the dynamic network is one of a controlled shutdown and failure of the second server.

14. The method of claim 1, wherein the removal of the first and/or second servers occurs during a transient period of redundancy switchover.

15. The method of claim 1, wherein removal of the first and second servers occurs during a transient period of redundancy switchover.

* * * * *